(12) United States Patent
Sparbert

(10) Patent No.: US 11,827,187 B2
(45) Date of Patent: Nov. 28, 2023

(54) APPARATUS EMBODIED TO DETECT THE SURROUNDINGS AND METHOD FOR CLEANING A COVER OF SUCH AN APPARATUS

(71) Applicant: Robert Bosch GmbH, Stuttgart (DE)

(72) Inventor: Jan Sparbert, Rutesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 302 days.

(21) Appl. No.: 16/759,823

(22) PCT Filed: Nov. 12, 2018

(86) PCT No.: PCT/EP2018/080868
§ 371 (c)(1),
(2) Date: Apr. 28, 2020

(87) PCT Pub. No.: WO2019/105722
PCT Pub. Date: Jun. 6, 2019

(65) Prior Publication Data
US 2020/0307525 A1 Oct. 1, 2020

(30) Foreign Application Priority Data
Nov. 30, 2017 (DE) .......................... 102017221522.4

(51) Int. Cl.
*B60S 1/56* (2006.01)
*B60S 1/02* (2006.01)
(Continued)

(52) U.S. Cl.
CPC .............. *B60S 1/566* (2013.01); *B60S 1/026* (2013.01); *B60S 1/04* (2013.01); *B60S 1/52* (2013.01);
(Continued)

(58) Field of Classification Search
None
See application file for complete search history.

(56) References Cited

U.S. PATENT DOCUMENTS 6,161,247 A 12/2000 Breau et al.
2016/0315564 A1 10/2016 Kotani
(Continued)

FOREIGN PATENT DOCUMENTS

CN 107399319 A 11/2017
DE 3839484 A1 5/1990
(Continued)

OTHER PUBLICATIONS

English Machine Translation of DE-102016108978-A1.*
International Search Report for PCT/EP2018/080868, dated Jan. 30, 2019.

*Primary Examiner* — Natasha N Campbell
*Assistant Examiner* — Pradhuman Parihar
(74) *Attorney, Agent, or Firm* — NORTON ROSE FULBRIGHT US LLP; Gerard Messina

(57) ABSTRACT

A device for acquiring a surrounding environment of a vehicle. The device includes a sensor housing and at least one sensor situated inside the sensor housing. The sensor housing has a transmit/receive window. The device has a cover made transparent for the sensor signals, and the cover is designed to cover the transmit/receive window, and thus the at least one sensor, relative to an external surrounding environment of the device. The device has a cleaning unit that is situated on an outer side of the sensor housing and is movable along the sensor housing by a drive unit. The cleaning unit is designed to remove contamination from the cover of the transmit/receive window. The cleaning unit is realized as a space that is closed relative to the external surrounding environment.

11 Claims, 2 Drawing Sheets

(51) Int. Cl.
  *B60S 1/04*     (2006.01)
  *B60S 1/52*     (2006.01)
  *G02B 27/00*    (2006.01)
  *G01S 17/931*   (2020.01)
  *G01S 7/481*    (2006.01)
  *G01S 7/497*    (2006.01)

(52) U.S. Cl.
  CPC ........ *G02B 27/0006* (2013.01); *G01S 7/4813* (2013.01); *G01S 7/497* (2013.01); *G01S 17/931* (2020.01); *G01S 2007/4977* (2013.01)

(56)          References Cited

U.S. PATENT DOCUMENTS

2017/0313288 A1    11/2017  Tippy et al.
2018/0290632 A1*   10/2018  Rice .......................... B60S 1/56

FOREIGN PATENT DOCUMENTS

| DE | 102011017684 A1 |   | 11/2011 |
| DE | 102015013203 A1 |   | 3/2016 |
| DE | 102016125113 A1 |   | 7/2017 |
| DE | 102016108978 A1 | * | 11/2017 |
| DE | 102016108978 A1 |   | 11/2017 |
| DE | 102016215525 A1 |   | 2/2018 |
| WO |    2015003705 A1 |   | 1/2015 |
| WO |    2016004936 A1 |   | 1/2016 |

* cited by examiner

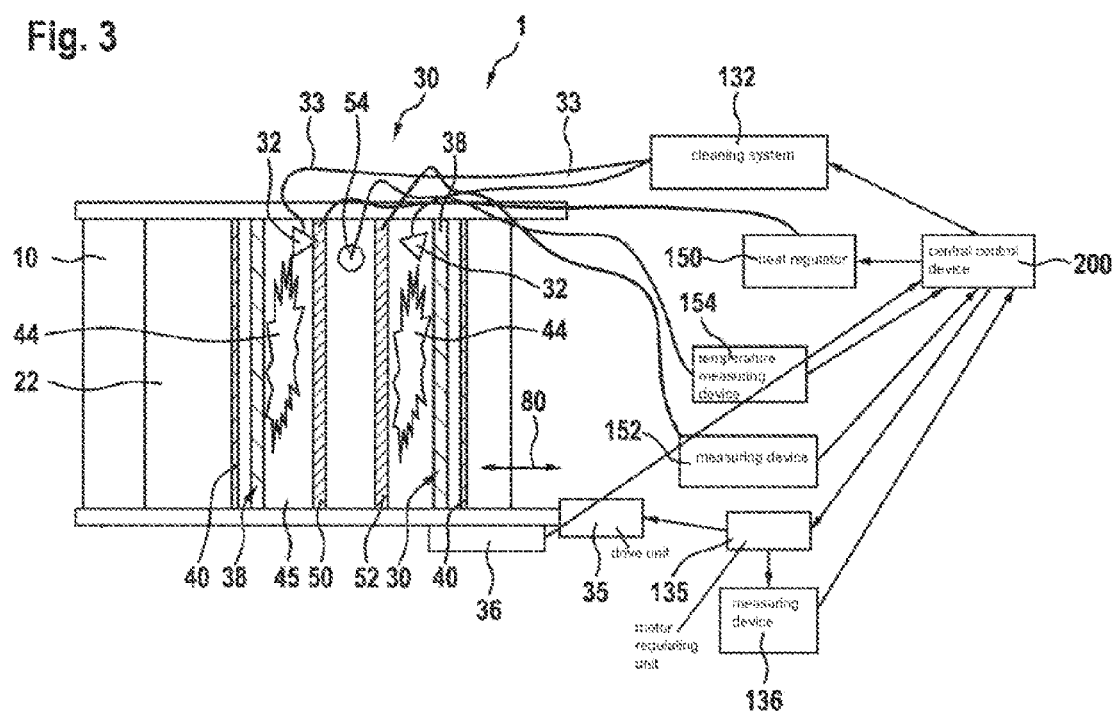

APPARATUS EMBODIED TO DETECT THE SURROUNDINGS AND METHOD FOR CLEANING A COVER OF SUCH AN APPARATUS

FIELD

The present invention relates to a device designed to acquire a surrounding environment, in particular to acquire the surrounding environment of a vehicle, and to a method for cleaning a cover of such a device.

BACKGROUND INFORMATION

The ability to acquire an environment surrounding a motor vehicle as completely as possible using sensors is a basic precondition for automated driving. For this purpose, various environmental sensors are used, such as radar sensors, ultrasound sensors, cameras, and lidar systems, each of which has to be integrated into a vehicle. In particular, lidar sensors will become more established in the coming years with the realization of highly automated driving functions on highways and in urban environments. An important property of such optical sensors is that the expected level of performance can be achieved only if the optical exit window to the surrounding environment is free of contamination or blockages. The recognition of contamination or blockages is known in principle, and in part has been realized, for many sensors today. For lidar sensors, available solutions have significant weaknesses. For example, spray nozzles, which attempt to remove contamination using high pressure, are standardly used. Their cleaning effect is not always reliable, and their water consumption is too high. To increase the cleaning effect, in some cases wipers are additionally used, with which raindrops can also be wiped away. However, the wipers require an additional technical outlay, entail an optical intervention in the vehicle design, are parts subject to wear, and can damage the optical surfaces if wiping takes place under too-dry conditions. Ultrasound cleaning systems, currently in development, cannot be used due to their energy consumption and the intervention in the optical properties of the window. For de-icing, currently hot wires are embedded in the optical window. These wires impair the optical properties of the window, and show aging effects that are generally undesirable. The heating requires high levels of heating power, because at high speeds and low temperatures, the wind chill dissipates the heat very quickly (some tens of watts). In particular in the case of autonomous driving, this is unacceptable, and a reliable mechanism has to be provided for removing contamination of the sensor.

Video cameras will also increasingly be installed on the exterior of the vehicle in the future. Known solutions for parking assistance using wide-angle cameras also have spray nozzles or wipers, having the disadvantages named above.

United States Appl. Pub. No. US 2016/0315564 A1 and PCT Application No. WO 2015/003705 A1, describe wiper systems that use a wiper blade, in the manner of a windshield wiper, to remove contamination from the cover of a transmit/receive window of a sensor.

PCT Application No. WO 2016/004936, describes the use of air nozzles to blow away dirt.

German Patent Application No. DE 102011017684 A1 describes the use of water nozzles to wash away dirt.

An object of the present invention is to combine the conventional designs for cleaning and environmental sensors in such a way that an optimal cleaning result can always be achieved, regardless of the environmental conditions (for example the temperature T) and the type of contamination on the cover of a transmit/receive window of a relevant sensor.

SUMMARY

The present invention provides a device designed for acquiring the surrounding environment, having a compact cleaning unit, the cleaning unit implementing various cleaning designs. In this way, it is ensured that under various environmental conditions, and given different types of contamination, an optimal cleaning result can be achieved, thus ensuring that the environmental sensor of the device can always carry out an environmental acquisition without signals being blocked by contamination.

In accordance with an example embodiment of the present invention, a device is provided that is designed for environmental acquisition, in particular for acquiring the surrounding environment of a vehicle, and having at least one sensor situated inside the sensor housing. The sensor housing has a transmit/receive window through which corresponding sensor signals can be sent into the surrounding environment by the sensor, and/or sensor signals can be received from the surrounding environment. The device has a cover, the cover being made transparent to the sensor signals, and the cover being designed to cover the transmit/receive window, and thus the at least one sensor, relative to an external surrounding environment of the device. The sensor can be for example a camera and/or a lidar sensor. A camera receives light, for example visible light, as sensor signals; therefore, the cover is in this case realized as, for example, a plate transparent to light, e.g., made of glass or plastic. A lidar sensor sends out laser beams having a wavelength, e.g., in the visible or in the infrared range as sensor signals, and receives the laser beams reflected by objects in the environment, via one or more photodiodes. In this case as well, the cover can be realized for example as a transparent plate, e.g., made of glass or plastic that is transparent to light of the laser wavelength.

According to an example embodiment of the present invention, the device has a cleaning unit that is situated on an outer side of the sensor housing, and that is movable by a drive unit along the cover of the transmit/receive window of the sensor housing. The cleaning unit is designed to remove contamination from the cover of the transmit/receive window. According to the present invention, the cleaning unit has a housing that, together with the cover, forms a space that is substantially closed relative to the external surrounding environment. Here, a closed space is to be understood as a region of space that is limited by the walls of the housing and by the cover, and in this way is protected from influences from the surrounding environment. The closed space here need not necessarily be airtight, liquid-tight, or hermetically sealed. Thus, for example runoff holes for liquids may be provided in the housing. In addition, movement of the housing along the cover must be enabled.

Accordingly, the present invention provides a mechanically driven cleaning unit, in particular realized as a wiper-washer-heating system, whose largely closed space is guided over the transmit/receive window of the device designed for acquisition of the surrounding environment. For the cleaning, the cleaning unit can have a nozzle or spray device, and/or one or more wiper blades.

Preferably, the cleaning unit inside the housing has at least one wiper blade that is in frictional contact with the cover. Particular preferably, the cleaning unit has at least two such wiper blades. The wiper blades are designed to clear away contamination through the relative movement of the cover and the cleaning unit, and for this purpose can have for example one or more rubber lips. The wiper blades can also form a part of the edge of the housing.

Preferably, the cleaning unit inside the housing has at least one nozzle that is designed to spray a cleaning fluid, for example water, onto the cover in order to remove contamination. The nozzle is connected to a reservoir having cleaning fluid, for example via one or more hoses. Preferably, in addition the cleaning fluid can be heated as needed, e.g., by heating the reservoir and/or by heating the nozzle. Through the heating of the cleaning fluid, a contamination by ice on the cover can be directly removed. In addition, at low external temperatures the cleaning fluid can be prevented from freezing and thus clogging the first nozzles.

The closed space advantageously reduces the consumption of cleaning fluid, because the fluid acts in more concentrated fashion on a smaller surface, and can act in the space for a while without being able to flow away.

In a possible embodiment of the present invention, the cleaning fluid can be conducted in the interior of the wiper blades, and can be dispensed at the surface of the wiper blades. In this way, separate nozzles can be done without.

Alternatively or in addition, the cleaning unit can have one or more additional nozzles outside the housing, which spray onto the contamination on the outer side in front of the one or more wiper blades.

In a preferred embodiment of the present invention, the cleaning unit has at least one heating device that is designed to heat the cover and/or the closed space. For de-icing, the cleaning unit contains a heating device, for example a heating conductor. In order to optimize the regulation of the operation of the heating device, the cleaning unit preferably contains a temperature sensor for measuring the surface temperature of the cover. The housing separates the closed space from the surrounding environment, so that the heating conductor cannot be removed from the surface of the cover by the movement of air/wind during travel. In a possible embodiment of the present invention, the heating device can be integrated in a wiper blade.

In a preferred embodiment of the present invention, the cleaning unit has a detector unit that is designed to acquire a contamination of the cover. For this purpose, the detector unit can for example be realized as an optical sensor, such as a camera or a reflex light barrier. The detector unit can be designed for example to acquire an image of the cover at regular temporal intervals. Using conventional methods of digital image processing, from the acquired image it can be determined whether there is a contamination of the cover. Alternatively or in addition, it can be acquired whether increased friction caused by the contamination occurs during the movement of the cleaning unit. If such contamination is recognized, the cleaning unit can be activated. In this way, the technical advantage is achieved that the cleaning unit is set into operation and moved only as needed, i.e., only when contamination is actually present on the cover. This enables a particularly efficient use of the device.

In a further preferred embodiment of the present invention, the device designed for environmental acquisition has a temperature sensor that is designed and situated to acquire a temperature of the cover and/or of the closed space formed by the housing of the cleaning unit and the cover.

In a preferred embodiment of the present invention, the sensor housing has at least one guide rail. The cleaning unit is situated on the outer side of the sensor housing by the guide rail, and can be moved by the drive unit along the guide rail, in particular back and forth in front of the cover.

The drive unit can include for example a step motor and/or a gear transmission. Alternative embodiments of the drive unit can include for example, alternatively or in addition, a gear transmission and/or a belt drive and/or a lever mechanism and/or an eccentric drive. Preferably, a regulation of the drive unit takes place such that the rate of advance or the repetition rate of the cleaning process is adapted to the degree of contamination or degree of icing. For this purpose, preferably a detector unit is present that recognizes a contamination for example optically, or detects increased friction, caused by the contamination, during the advance, and thus infers the presence of contamination/icing. This detector unit can be installed in the cleaning unit or can be situated outside the cleaning unit, e.g., in the lidar sensor.

The cleaning unit can be designed to report the current state of cleaning and/or cleaning progress to a driver assistance system, so that potential degradation of the measurement results of the lidar sensor can be taken into account in the driving assistance function. The cleaning unit can be designed to report a current position to a driver assistance system via the transmit/receive window, so that the driver assistance system can take into account the occlusion of the field of view. The cleaning unit can for example be controlled by the control device of the lidar sensor using software that processes the measurement data of the cleaning unit and other systems. Thus, for example the cleaning unit can be switched off when a mechanical blockade is recognized. In addition, the most important cleaning areas can be prioritized in the case of heavy, continuous use.

After cleaning has taken place, the cleaning unit can be moved into a park position, so that it does not negatively influence the regulating operation of the lidar sensor.

Preferably, the cleaning unit is designed so as to be capable of being maintained or exchanged completely or in parts.

According to a further aspect of the present invention, an example method is described for cleaning a cover of a device for environmental acquisition, the device being designed as described above. The device has a cleaning unit that is moved along the housing by the drive unit, and contamination is removed from the cover by the cleaning unit.

Preferably, the cleaning unit can report a current state of cleaning and/or cleaning progress to a driver assistance system, and degradation of the measurement results of the sensor caused by the current contamination can be taken into account in a driver assistance function.

Preferably, the cleaning unit can report its current position relative to the transmit/receive window to a driver assistance system, so that an occlusion of the field of view of the sensor by the cleaning unit can be taken into account in a driver assistance function.

The example device according to the present invention and the example method according to the present invention offer the advantages that a combination of different cleaning elements or cleaning designs can take place in a single compact system. Advantageously, a high level of cleaning performance is achieved in connection with rapid thawing or de-icing. Due to the closed design of the cleaning unit, a low consumption of cleaning fluid and a low heating power can be adequate for effective cleaning. Through the use of additional sensors, such as a temperature sensor and/or a detector unit for contamination, the fastest possible cleaning and targeted regulation of the cleaning unit can take place. The present invention requires only a small intervention in the vehicle design, and can be realized for various surface shapes, in particular for cylindrical surfaces such as those frequently used in sensor housings of lidar sensors. The cleaning unit is made so as to be capable of being mounted or integrated directly on the sensor housing, and thus does not require any additional adjustment.

BRIEF DESCRIPTION OF THE DRAWINGS

FIG. 3 shows a device according to an exemplary embodiment of the present invention, in section.

DETAILED DESCRIPTION OF EXAMPLE EMBODIMENTS

Figure 1:
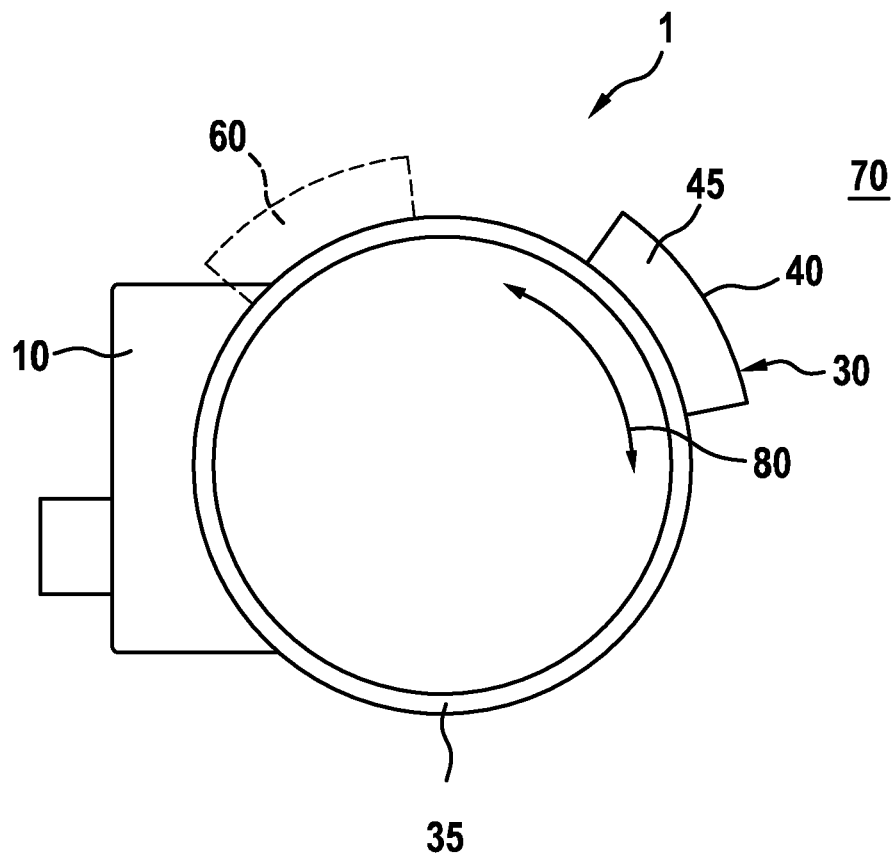
FIG. 1 schematically shows a device according to an exemplary embodiment of the present invention, in a top view.

In the following description of exemplary embodiments of the present invention, identical elements are designated with the same reference characters, and repeated description of these elements is omitted if warranted. The Figures represent the subject matter of the present invention only schematically.

Figure 2:
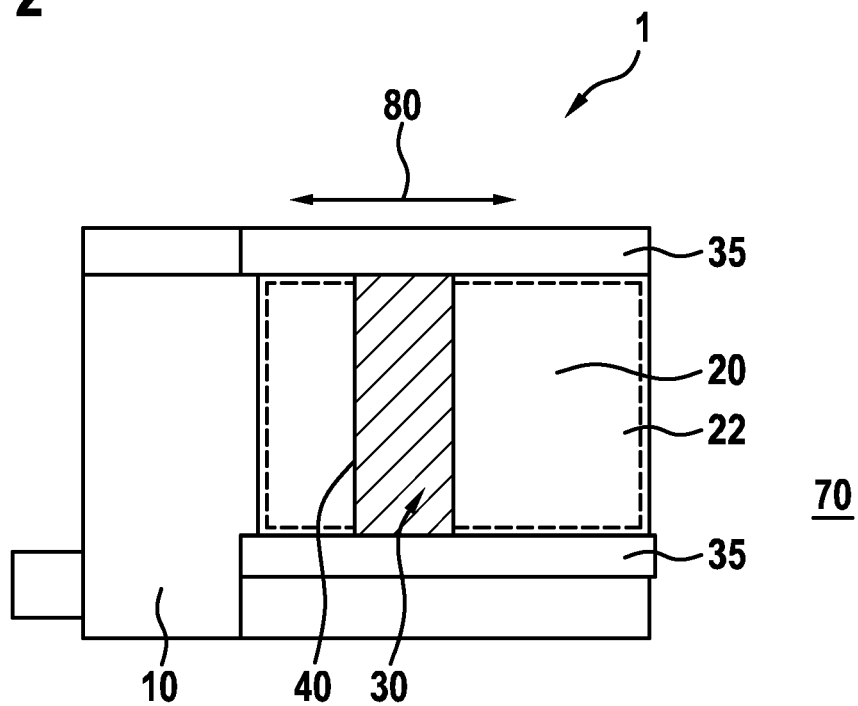
FIG. 2 schematically shows the device of FIG. 1 in a side view.

FIGS. 1 and 2 show an example device 1 that is designed to acquire the surrounding environment of a vehicle, and in this example is realized as a lidar sensor system. Device 1 includes a sensor housing 10 inside which at least one lidar sensor is situated (not shown). Sensor housing 10 has a transmit/receive window 20 and a cover 22, the cover being made transparent for the operating wavelength(s) of the sensor signals of the lidar sensor. Cover 22, for example a glass plate, is designed to cover transmit/receive window 20 relative to an external surrounding environment 70 of device 1. Sensor housing 10 is made substantially cylindrical in the region of transmit/receive window 20. Cover 22 is matched to the cylindrical shape.

According to the present invention, device 1 has a cleaning unit 30 (wiper-washer-heating system). Cleaning unit 30 has a housing 40 whose shape is matched to the surface of cover 22, which housing is guided over the surface of cover 22 by a drive unit 35. The possible directions of movement are indicated by double arrow 80. Housing 40 has for example an open side, and lies with the edges of its open side flush against cover 22, so that housing 40 forms, with cover 22, a space 45 that is closed relative to outer surrounding environment 70. Inside housing 40, one or more cleaning elements are situated that are used to clean the cover of contamination. This is described in more detail in connection with FIG. 3.

Drive unit 35 can be set into a recess [ . . . ] device 1. Alternatively, drive unit 35 can be placed onto sensor housing 10 as a cover, or is fixedly integrated as a part of sensor housing 10. Drive unit 35 can be made with one or two sides. A park position 60 is provided at which cleaning unit 30 can be "parked" when it is not in operation.

FIG. 3 shows a device according to an exemplary embodiment of the present invention, in section. Various cleaning element, as well as various sensors, are provided in the interior of housing 40 of cleaning unit 30: two wiper blades 38 for removing water or contaminated cleaning fluid are situated perpendicular to the direction of movement 80 inside the housing. Rubber lips of wiper blades 38 stand in frictional contact with cover 22 for this purpose. In addition, two spray nozzles 32 are situated inside housing 40, of which each is connected to a cleaning system 132 by a supply hose 33. Cleaning system 132 includes for example a reservoir having a cleaning fluid, an element for producing pressure, and an electrically controllable valve. Using spray nozzles 32, the surface of cover 22 is wetted with cleaning fluid 44, or is cleaned with pressure. In addition, a heating device 50 is provided inside the housing. The controlling of the heating device takes place via an external heat regulator 150. In addition, a temperature sensor 54 is situated inside housing 40, as well as a measuring device 52 for measuring the degree of contamination. The measurements take place in each case via associated measurement devices 152 and 154. Temperature measuring device 154 records data of temperature sensor 54, and ascertains therefrom the current temperature inside housing 40. Measuring device 152 records data of detector unit 52 and ascertains therefrom whether there is currently a contamination of cover 22.

In addition, housing 40 can have runoff holes for the liquids situated inside it (not shown).

The housing can be moved back and forth along the cover in direction 80 by a drive unit 35. For this purpose, drive unit 35 has a drive system, e.g., a gear transmission, as well as a motor that is regulated by a motor regulating unit 135. Using an additional measuring device 136, an additional or alternative acquisition of a contamination can take place, e.g., via the acquisition of the frictional value or the acquisition of a blockade, e.g., by the measurement of torque. In addition, a path or angular measuring device 36 is provided for controlling the motor and for ascertaining the current position of cleaning unit 30.

A central control device 200 having a software program processes all the measurement data and controls heating regulator 150, cleaning system 132, and drive unit 35. The controlling at the software side permits in particular an adaptation of the cleaning speed to the degree of contamination, as well as an adaptation of the cleaning frequency to the degree of contamination. In addition, in the case of local contamination of cover 22 a locally adapted cleaning can take place in a targeted manner. In addition, information about the current position of the system, and thus about a current occlusion of the field of view of the sensor, and further states, can be communicated to higher-order systems, e.g., a driver assistance system that can correspondingly take this information into account. In addition, if a cleaning is repeatedly unsuccessful, the cleaning process can be aborted.

Particular advantages of the present invention result from the course of the cleaning process inside closed space 45, i.e., a protected and relatively small volume:

the amount of cleaning fluid required for the effective cleaning of the cover is small, because the duration of action and efficiency of action inside the housing can be optimized. In addition, a de-icing can take place with a relatively low power level, or more quickly, because the volume to be heated is small and housing 40 externally protects the volume from cooling.

What is claimed is:

1. A device for acquiring a surrounding environment of a vehicle, comprising:
  a sensor housing and at least one sensor situated inside the sensor housing, the sensor housing having a transmit/receive window and a cover, the cover being transparent for sensor signals of the at least one sensor, and the cover being configured to cover the transmit/receive window relative to an outer surrounding environment of the device; and
  a cleaning unit that is situated on an outer side of the sensor housing and can be moved along the cover by a driver, the cleaning unit being configured to remove contamination from the cover, and the cleaning unit having a housing that forms, with the cover, a space that is closed relative to the external surrounding environment, wherein one or more cleaning elements are situated inside the housing of the cleaning unit, wherein the cleaning unit comprises a control device configured to reports (i) a current state of cleaning and/or cleaning progress including a degree of occlusion of a field of view of the at least one sensor, and (ii) a degradation of measurement results of the at least one sensor caused by a current contamination, to a driver assistance system, wherein the driver assistance system is configured to autonomously drive the vehicle based on a cleaning unit report.

2. The device as recited in claim 1, wherein the sensor housing has at least one guide rail, the cleaning unit being situated on an outer side of the sensor housing via the guide rail, and the cleaning unit being movable along the guide rail by the driver.

3. The device as recited in claim 1, wherein the one or more cleaning elements includes at least one wiper blade that is in frictional contact with the cover.

4. The device as recited in claim 1, wherein the cleaning unit includes at least one heating element that is configured to heat the cover and/or the closed space.

5. The device as recited in claim 1, wherein the one or more cleaning elements includes at least one nozzle that is designed to spray a cleaning fluid onto the cover.

6. The device as recited in claim 5, wherein the cleaning fluid is water.

7. The device as recited in claim 5, wherein the driver includes a step motor and/or a gear transmission and/or a belt drive and/or a lever mechanism and/or an eccentric drive.

8. The device as recited in claim 1, wherein the cleaning unit includes a detector unit that is configured to acquire a contamination of the cover.

9. The device as recited in claim 1, wherein the cleaning unit includes a temperature sensor that is configured and situated to acquire a temperature of the cover and/or a temperature inside the closed space.

10. A method for cleaning a cover of a device for acquiring a surrounding environment of a vehicle, the device including a sensor housing and at least one sensor situated inside the sensor housing, the sensor housing having a transmit/receive window and a cover, the cover being transparent for sensor signals of the at least one sensor, and the cover being configured to cover the transmit/receive window relative to an outer surrounding environment of the device, and a cleaning unit that is situated on an outer side of the sensor housing and can be moved along the cover by a driver, the cleaning unit being configured to remove contamination from the cover, the method comprising the following steps:

moving the cleaning unit, by the driver, along the cover, the cleaning unit having a housing that forms, with the cover, a space that is closed relative to an external surrounding environment, one or more cleaning elements being situated inside the housing of the cleaning unit; and removing contamination from the cover by the cleaning elements of the cleaning unit, wherein the cleaning unit reports (i) a current state of cleaning and/or cleaning progress including a degree of occlusion of a field of view of the at least one sensor, and (ii) a degradation of measurement results of the at least one sensor caused by a current contamination, to a driver assistance system, wherein the driver assistance system is configured to autonomously drive the vehicle based on the cleaning unit report.

11. The method as recited in claim 10, wherein the cleaning unit is brought into a park position after the removing of the contamination has taken place.

* * * * *